//

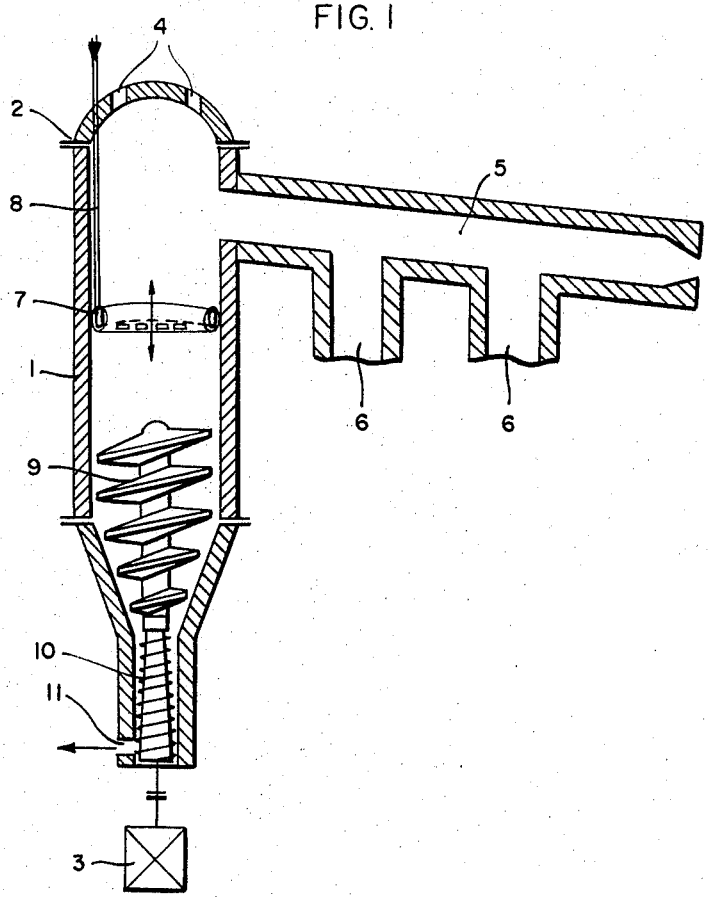
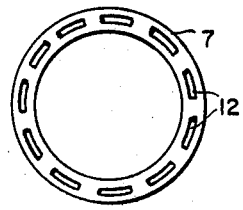
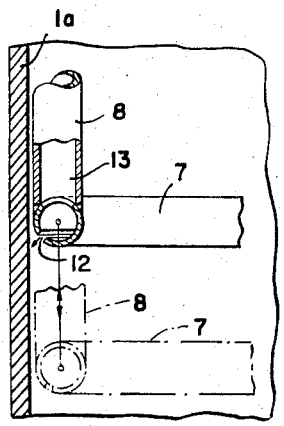

United States Patent Office 3,477,094
Patented Nov. 11, 1969

3,477,094
APPARATUS FOR THE CONTINUOUS REMOVAL OF VOLATILE CONSTITUENTS FROM POLYAMIDES
Paul Maahs, Bad Durkheim, and Hans-Georg Matthies and Friedrich Wenger, Ludwigshafen (Rhine), Germany, assignors to Badische Anilin- & Soda-Fabrik Aktiengesellschaft, Ludwigshafen (Rhine), Germany
Filed Apr. 30, 1965, Ser. No. 452,243
Claims priority, application Germany, May 5, 1964, B 76,644
Int. Cl. B29j 1/00
U.S. Cl. 18—2     3 Claims

ABSTRACT OF THE DISCLOSURE

Apparatus for the continuous removal of volatile constituents from molten polyamides at elevated temperatures and subatmospheric pressures, said apparatus including a reactor having a cylindrical upper portion, a conical middle portion and a cylindrical lower portion, wherein are provided: (A) a suction pipe in said upper portion having at least one collecting container; (B) an annular slot die below the opening to said suction pipe, said slot die being movable in the direction of the main axis of the reactor and having at least one slot directed toward the wall of the reactor; (C) a motor-driven mixing member located in the lower portion of the reactor, the upper part of said mixing member being constructed as a stirrer and the lower part (located in said cylindrical lower portion of the reactor) being constructed as a screw.

---

This invention relates to a process and apparatus for the continuous removal of volatile constituents from molten polyamides at elevated temperatures and subatmospheric pressure.

Polyamides which have been prepared by polymerization of lactams in the presence of acid or neutral catalysts and stabilizers, contain monomers and oligomers. This content of volatile constituents is particularly troublesome in continuous methods, for example when a continuous spinning follows the continuous polymerization. Usually the filaments and threads thus obtained have strength properties which do not meet the requirements which particularly in recent years have become more stringent.

It is known that the volatile constituents may be removed at subatmospheric pressure and elevated temperature by passing the molten polyamide continuously through an annular nozzle into a reactor, evaporating the volatile constituents from the free-falling melt and then discharging the melt.

It is also known that the volatile constituents may be removed by distilling them out from the molten polyamide at subatmospheric pressure and elevated temperature, if desired in a plurality of stages, for example by continuously circulating molten polylactam in a polymerization apparatus having an overflow vessel in which subatmospheric pressure prevails.

This method has disadvantages. Thus distilling off the volatile constituents from melts leads to marked frothing so that the suction lines may be clogged up. In methods in which the melt falls at best in filamentary form through the reactor in which subatmospheric pressure prevails there is a risk that the filaments, owing to the subatmospheric pressure, may contact the heated walls, stick together and be inadequately extracted owing to short residence terms. In the case of melts of polyamides which contain water, it is difficult to prepare filaments at all because such melts often fall to the bottom in drops and practically cannot therefore be freed from volatile constituents. Moreover, it is frequently impossible to increase the viscosity of the polyamide during the removal of volatile constituents, effected in a short time, to such an extent that the polyamide is suitable for the production of high-strength yarns.

Furthermore it is known that volatile constituents may be removed from polyamides by a three-stage method in which the polyamide melt is treated first at subatmospheric pressure, then at atmospheric pressure and finally again at subatmospheric pressure. Three stages are necessary in order that not only the volatile constituents should be removed but an increase in the viscosity of the polyamide should be achieved. This method is technically expensive and unecomonical. The proportion of extractable constituents, which is decreased to about 2% in the first stage, increases by twice this amount in the second stage which is necessary for increasing the viscosity of the polyamide, and must be decreased again in a third stage.

We have now found that the volatile constituents can be continuously removed particularly advantageously from synthetic linear polyamides having recurring —CO—NH—groups in the main chain at elevated temperatures and subatmospheric pressure by distributing the molten polyamide at a temperature above its melting point over the surface of a reactor in the form of a film, removing the volatile constituents at subatmospheric pressures of 0.1 to 50 mm. Hg and temperatures of 240° to 300° C., homogenizing the polyamide melt and continuously discharging it.

Polyamides which have been freed from volatile constituents according to this invention are homogeneous and practically uncrosslinked. It is possible at the same time to increase their viscosity to such an extent that the polymers are particularly suitable for high tensile yarns.

It is advantageous to carry out the process according to the invention by passing the polyamide from the continuously operated polymerization vessel into a reactor heated to 240° to 300° C., preferably 260° to 280° C., in which subatmospheric pressures of 0.1 to 50 mm. Hg, preferably 0.5 to 30 mm. Hg, prevail, in such a way that the melt flows down the walls of the vertical reactor as a coherent film. The rate of flow in the film should be great enough for the material not to be damaged by the hot wall but not so great that the content of volatile constituents is more than 0.5% with reference to the total weight of the polyamide. In most cases rates of flow of 1.5 to 5 g. per minute per sq. dm., preferably 2 to 3.5 g. per minute per sq. dm., have proved to be advantageous. The polyamide melt collecting at the bottom is continuously homogenized by stirring and then discharged with the building up of pressure. The residence time of the polyamide melt depends on the desired content of volatile constituents and also on the desired increase in viscosity. It is generally 15 to 120 minutes, preferably 20 to 40 minutes. The polyamide may be passed immediately to apparatus for the continuous production of molded articles, for example to conventional spinning machines.

Examples of polyamides which are suitable for removal of volatile constituents by the process of the invention are those which have been prepared by conventional methods by polycondensation of lactams having six to twelve carbon atoms, such as caprolactam, oenantholactam, capryllactam or laurolactam, in the presence of the conventional acid or neutral catalysts, stabilizers and additives. Polyamides which have been prepared by polymerization of loctams in the presence of conventional catalysts and a mixture of soluble copper compounds and halolactams, which have a stabilizing action, are particularly suitable.

Apparatus for carrying out the process according to this invention is characterized by the provision, in a preferably vertical cylindrical reactor having a lower conical portion which terminates in a cylindrical portion, of:

(1) A suction pipe having one or more vertical collecting chambers closed at the bottom, said suction pipe being beneath the upper closure of the reactor;

(2) An annular slot die beneath the suction pipe extending into the vicinity of the surface of the cylinder, said annular slot die being movable in the direction of the main axis and the slots in said die opening towards the wall of the reactor; and (3) A motor-driven mixing member mounted in the lower part of the reactor, the mixing member being constructed as a stirrer in the conical portion of the reactor and as a screw shaft in the lower cylindrical portion of the reactor.

An embodiment of apparatus according to this invention is shown by way of example in the drawings in which:

FIG. 1 is a vertical section view of a device showing the subject apparatus;

FIG. 2 is a bottom plan view of one form of a slot die; and

FIG. 3 is an exploded view of one embodiment of the invention. As shown in FIG. 1 reactor 1, capable of being heated and cooled in zones, is preferably made cylindrical in the portion in which the polyamide is to flow down as a film. A removable upper closure is provided at 2 and this has two sight glasses 4. Beneath the upper closure, a suction pipe 5 is provided to which one or more, preferably one to three, collecting containers 6 are connected at the bottom. In the reactor at a lower level than the suction pipe, a slot die 7 is provided which is advantageously annular and so constructed that the slots open towards the wall, and this is movable for the purpose of distributing the polyamide melt over the wall. The slot die is rigidly secured to a screw spindle 8 having a longitudinal bore and serving at the same time as a supply pipe for the polyamide belt. A mixing member 9, 10 is provided at the lower end of the reactor, the upper part of the mixing member being formed as a stirrer 9 and the lower part being formed as a screw shaft 10 for building up pressure. The mixing member is driven by a motor 3. The polyamide melt leaves the reactor through outlet opening 11.

FIGURE 2 is a bottom plan view of an annular slot die which includes slots 12 which open toward a wall of the reactor.

FIGURE 3 is an exploded view of one embodiment of the invention. In this view, slot 7 is shown as including slot 12. Pipe 8 is shown as including passage 13 which is in communication with the interior of slot die 7. The slot die 7 can be moved upward or downward as shown in FIGURE 3. In this connection supply pipe 8 is constructed so that it can be displaced longitudinally. Varying the length of supply pipe 8 causes the residence time of the melt on the inner wall of the reactor to be varied.

The heatable and coolable reactor is advantageously made of alloyed steel capable of withstanding subatmospheric pressures down to 0.1 mm. Hg and temperatures of up to 350° C. It may be in one piece but should advantageously be made from a plurality of pieces held together by flanges. Suitable reactors have a diameter for example of 100 to 400 mm. and a length of 1000 to 2000 mm. They are preferably arranged vertically.

The suction means, which is preferably constructed of the same material as the reactor, is preferably made cylindrical and advantageously provided with a jacket heating of a conventional type. The diameter of the suction pipe should not be less, but preferably more than half the diameter of the reactor. The collecting containers 6 of the suction means advantageously have the same diameter as the suction pipe and may contain instruments for measuring the internal temperature.

The slot die for introducing the molten polyamide into the reactor preferably has a circular cross-section. Dies whose cross-section is formed by two parallel long sides which are joined to the short sides by semicircles, are also suitable. The outlet openings for the melt provided in the underside of the annular die are advantageously formed as slots. They may however be circular. The measurements of the die are preferably such that its slots are in the immediate vicinity of the cylindrical wall of the reactor.

The supply pipe for the polyamide to the reactor, which is connected to the annular die, is advantageously constructed so that it may be displaced longitudinally. A hollow screw spindle is particularly suitable as the supply pipe, but supply pipes having different lengths may be used in which the residence time of the melt in the film on the inner wall of the reactor may be varied.

The reactor may contain measuring means of conventional design to measure the rate of flow of the film.

Suitable mixing members are for example stirrers, such as anchor agitators, propeller mixers, rod stirrers or advantageously screw mixers.

Known means are used as bearings and drive for the mixing members.

Conventional means are suitable for heating and cooling the reactor, such as resistance heating, induction heating, liquid heating or gas heating; liquid cooling, gas cooling by air containing water vapor.

Polyamides freed from volatile constituents according to the invention are particularly suitable for the production of molded articles, such as threads, filaments, wires, films or sheeting, or for the production of injection moldings.

The following examples will further illustrate the invention. The parts and percentages specified in the examples are by weight.

Example 1

The polyamide used is prepared in a conventional way by polycondensation of a mixture containing 2.5 parts of water, 0.18 part of cyclohexylamine acetate, 0.02 part of copper(II)acetate and 0.04 part of $\alpha$-bromocaprolactam (melting point 113° to 115° C.) to 100 parts of caprolactam. The polyamide has a relative viscosity of 2.4 (measured in 96% sulfuric acid) and a content of volatile constituents of about 10%. The molten polyamide is continuously passed by a gear pump into the reactor according to FIGURE 1, the wall temperature being about 270° C. The rate of flow of the melt in the form of a coherent film through the annular die is 2.5 g. per minute per sq. dm., the total residence time of the melt in the reactor is about forty minutes and the subatmospheric pressure is about 0.1 mm. Hg. The melt is homogenized at the bottom by stirring and continuously discharged with a screw whose core increases in diameter towards its lower end (compression: 1:2.5). The relative viscosity of the polyamide melt is now about 3.05, the content of extractable non-volatile constituents is 2.4% and the water content is less than 0.1%.

Filaments prepared from the melt and stretched in a conventional way have the following properties:

relative viscosity: 3.05
extractable non-volatile constituents: 2.4%
volatile constituents: none
individual titer: 6 denier
tensile strength: 7.8 to 8.2 g./denier
elongation: 14 to 16%
thermal stability: 96%

(Thermal stability is measured by determining the tensile strength in the conventional way after the filament has been heated in air at 190° C. for three hours.)

Example 2

A polyamide which has been prepared by polycondensation of a mixture containing 2.5 parts of water, 0.18 part of cyclohexylamine acetate, 0.02 part of silver acetate and 0.025 part of $\alpha$-iodocaprolactam (melting point 127° C.) to 100 parts of caprolactam, and which has a relative viscosity of 2.35 is freed from volatile constituents as follows:

The molten polyamide is passed continuously by a gear pump into the reactor according to FIGURE 1 whose wall temperature is 280° C. The rate of flow of the polyamide film which is distributed by the annular die onto the inner surface of the reactor is 2.3 g. per minute per sq. dm. with a total residence time of fifty minutes and a subatmospheric pressure of 5 mm. Hg. The product, homogenized at the bottom of the reactor, is continuously discharged as described in Example 1. The relative viscosity of the polymer is 2.95, the content of non-volatile extractable constituents is 2.3%. Filaments made and stretched in the usual way from the melt have the following properties:

relative viscosity: 2.95
non-volatile extractable constituents: 2.3%
volatile constituents: less than 0.5%
individual titer: 8 denier
tensile strength: 7.7 to 8.1 g./denier
elongation: 14 to 16%
thermal stability: 91%

(determined as described in Example 1)

Example 3

A polyamide having a relative viscosity of 2.40 (prepared by polymerizing a mixture of 100 parts of caprolactam, 2.5 parts of water, 0.16 part of cyclohexylamine acetate, 0.02 part of copper(II)acetate and 0.04 part of α,α-dichlorocaprolactam) is continuously introduced as described in Example 1 into the reactor, whose wall temperature is 280° C., and freed from its volatile constituents. The rate of flow of the polyamide film is 1.75 g. per minute per sq. dm., the subatmospheric pressure is 1 mm. Hg and the total residence time of the polyamide is fifty-five minutes. The melt is homogenized and discharged continuously. The polyamide then has the following properties:

relative viscosity: 3.2
non-volatile extractable constituents: 2.3%.

Filaments prepared from the melt and stretched by conventional methods have the following properties:

relative viscosity: 3.2
non-volatile extractable constituents: 2.3%
volatile constituents: 0.3%
individual titer: 6 denier
tensile strength: 8 g./denier
elongation: 17%
thermal stability: 92%

We claim:
1. A process for the continuous removal of volatile constituents from molten synthetic linear polyamides having recurring —CO—NH— groups in the main chain at elevated temperatures and subatmospheric pressure which comprises distributing the molten polyamide as a film over the surface of a reactor at temperatures above its melting point, removing the volatile constituents at subatmospheric pressures of between 0.1 and 50 mm. Hg and temperatures between 240° and 300° C., homogenizing the polyamide melt and continuously discharging it.

2. Apparatus for the continuous removal of volatile constituents from a melt which comprises: a reactor having a heatable cylindrical upper portion; a suction pipe operatively connected to said upper portion and having at least one collecting container; an annular slot die mounted for vertical movement within said upper portion of said reactor and below the opening of said suction pipe to said upper portion, said die having at least one slot directed toward the wall of said reactor; a supply line for supplying melt to the movably mounted slot die; mixing means located in a lower portion of said reactor for homogenizing said melt; and an outlet opening for removing said melt from said reactor.

3. Apparatus for the continuous removal of volatile constituents from a melt which comprises: a reactor having a heatable cylindrical upper portion, a conical middle portion and a cylindrical lower portion; a suction pipe operatively connected to said upper portion and having at least one collecting container; an annular slot die mounted for vertical movement within said upper portion of said reactor and below the opening of said suction pipe to said upper portion, said die having at least one slot directed toward the wall of said reactor; a supply line for supplying melt to the movably mounted slot die; mixing means located in a lower portion of said reactor for homogenizing said melt, the upper part of said mixing means being in the form of a stirrer and the lower part being in the form of a screw; and an outlet opening for removing said melt from said reactor.

References Cited

UNITED STATES PATENTS 3,064,307  11/1962  Sanborn.
3,156,009  11/1964  Alsys.
3,368,008  2/1968  Azuma.

WILBUR L. McBAY, Primary Examiner

U.S. Cl. X.R.
18—12